Aug. 18, 1931.  M. ENGELMANN  1,818,974
BINOCULAR MICROSCOPE
Filed Feb. 19, 1930  2 Sheets-Sheet 1

Inventor
Max Engelmann
By his Attorney

Aug. 18, 1931.  M. ENGELMANN  1,818,974
BINOCULAR MICROSCOPE
Filed Feb. 19, 1930  2 Sheets-Sheet 2
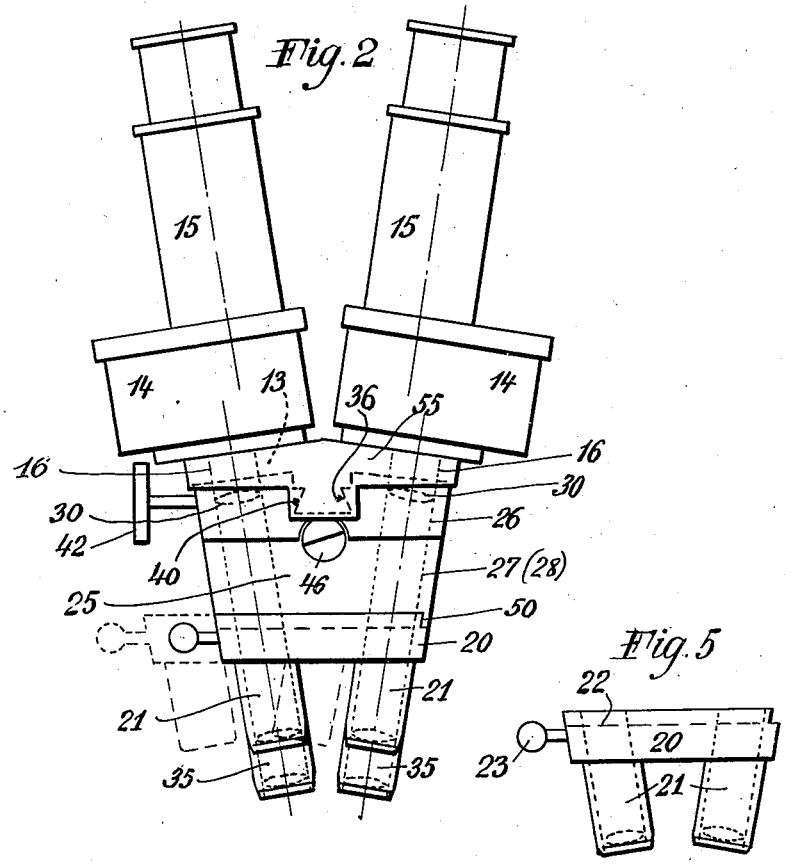
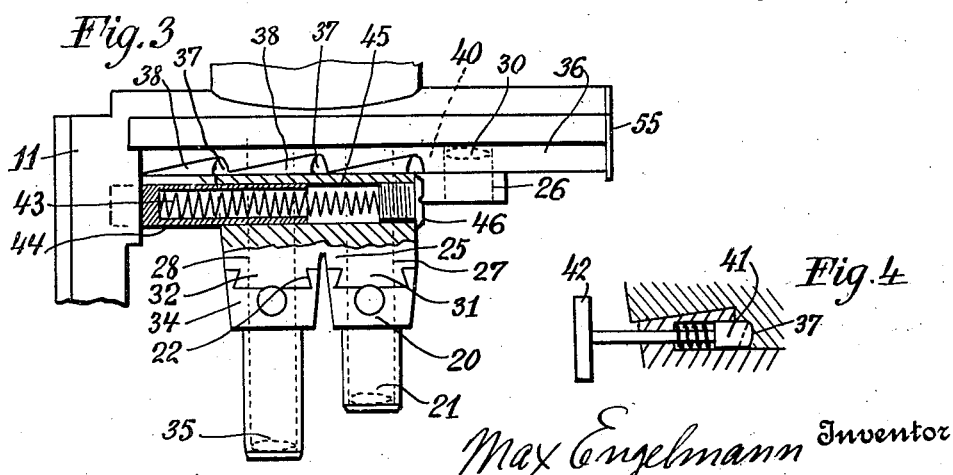

Patented Aug. 18, 1931

1,818,974

UNITED STATES PATENT OFFICE

MAX ENGELMANN, OF WETZLAR, GERMANY, ASSIGNOR TO ERNST LEITZ, OPTISCHE WERKE, OF WETZLAR, GERMANY, A CORPORATION OF GERMANY

BINOCULAR MICROSCOPE

Application filed February 19, 1930. Serial No. 429,479.

The object of this invention is to provide binocular microscopes with improved means or mechanism whereby the powers of magnification may be varied quickly in a very easy and expeditious manner.

More particularly it is the object of the invention to provide binocular microscopes with means, not only for shifting or moving paired objectives so as to vary the magnification, but also with means for quickly and easily interchanging pairs of objectives by removal and replacement.

To this end the invention is embodied in a binocular microscope in which several pairs of objectives are mounted in a carriage which may be shifted with respect to the optical axes by a sliding lateral reciprocatory movement, and the carriage is provided with means for removably supporting paired objectives in separate interchangeable units.

In the accompanying drawings illustrating the preferred form of the invention.

Fig. 2 is a front view of the upper part of the microscope looking in the direction of arrow 2 in Figure 1.

Fig. 3 is a detail view of the objective carrier and adjacent parts, partly sectional.

Fig. 4 is a detail view in section of the locking means for the objective carrier.

Fig. 5 illustrates an objective unit.

Figure 1:
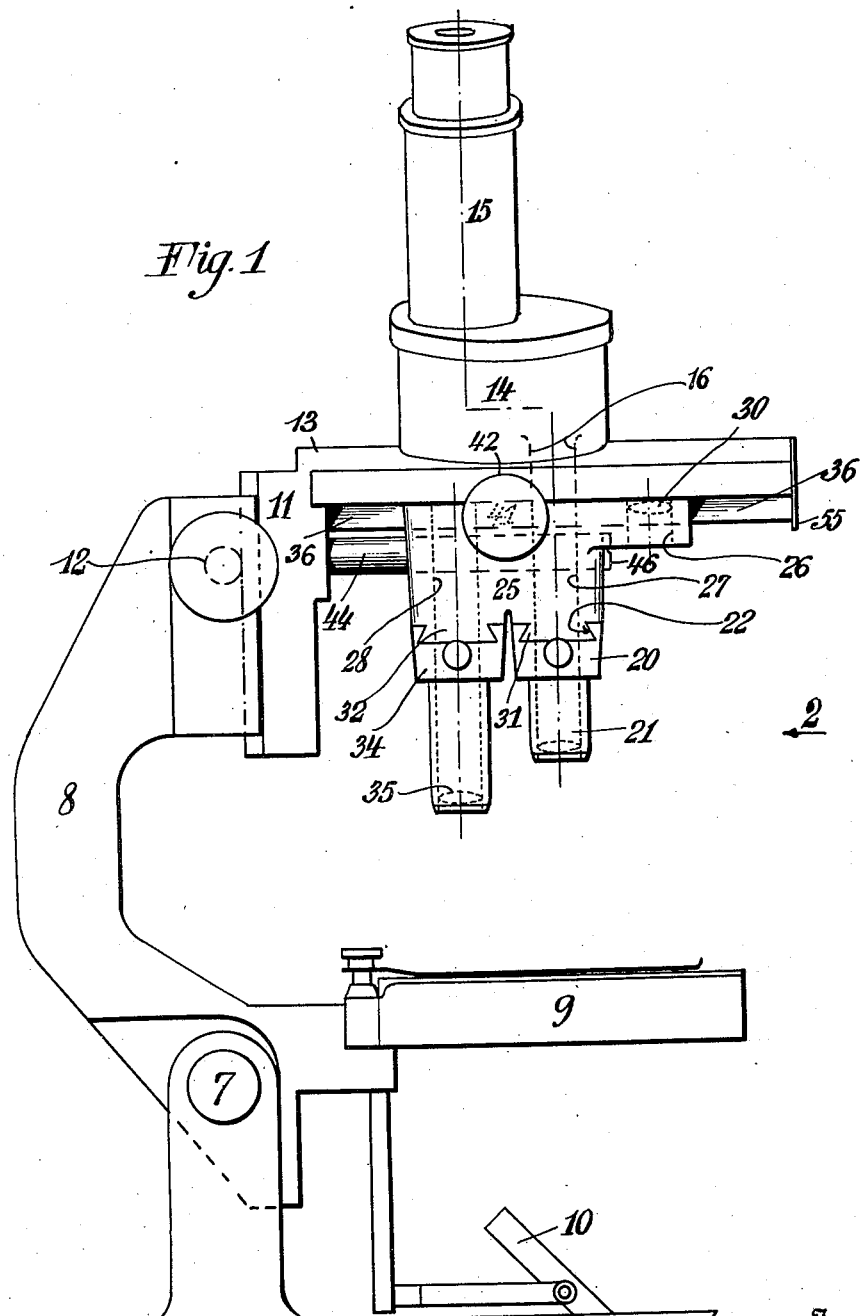
Fig. 1 is a side view of a binocular microscope embodying the invention with details omitted and parts broken away.

The microscope itself is of usual or standard construction being supported on a foot 6 on which is pivoted at 7 a tiltable bracket 8 which supports a stage 9 and a reflector 10.

The bracket 8 supports the microscope body 11 which is adapted to be adjusted vertically by the usual rack and pinion mechanism not shown in detail but indicated by the operating knob 12.

The body 11 is formed with a strong integral rigid base or plate 13 which supports the usual prism boxes 14, 14 and lens tubes 15, 15. The optical axes extend through the converging lens tubes 15, the prism boxes 14 and converging bores 16, 16 in the plate 13 in a manner well understood in the art.

The variable objectives are mounted in pairs so as to form separate individual paired objective units capable of being detachably mounted on the microscope and thereafter manipulated or operated so as to bring any one pair of objectives into proper converging relation with the converging optical axes.

Figure 5 illustrates a paired objective unit comprising a unit body 20 which supports a pair of converging objectives 21, 21 of a given power of magnification. The body is provided with a recessed dovetailed groove 22, see Figures 1 and 3, and a handle 23. There may be provided any convenient number of paired objective units of varying powers, all having the same unit body construction so as to be interchangeable on the microscope.

For the purpose of mounting and manipulating the variable power units there is provided a unit carrier 25 having three pairs of converging bores marked 26, 26; 27, 27 and 28, 28. The bores 26, 26 contain or hold in fixed relation the pair of low power objectives 30, 30. The other two pairs of bores extend through the carrier to the bottom thereof.

In the bottom and in alinement with the plane of the optical axes through the bores there are provided two dovetailed tracks or guides 31 and 32 adapted to receive and hold the unit bodies, the guides fitting into the dovetailed recesses on the bodies.

The drawings illustrate two paired objective units in position on the microscope. One unit 20 having objectives 21 register with the bores 27, 27 and another unit 34 having objectives 35, 35 registers with the bores 28, 28. Consequently, the microscope carries three pairs of paired objectives of varying powers, and of course, by sliding the units 20 and 34 off the guides or tracks, other units may be placed in position to change the powers.

The carrier 25 is adapted to be shifted with respect to the optical axes through the bores 16, 16 so as to bring any one pair of the three pairs of objectives into register therewith. To this end the plate 13 is provided with a dovetailed track 36 extending lengthwise thereof. The track is provided with three notches 37, 37 and sloping surfaces 38 from one notch to the other in the manner of saw teeth.

The carrier is formed in its upper surface with a longitudinal dovetailed recess 40 adapted to slide on the track 36. The carrier also has a spring pressed plunger 41, Figure 4, adapted to engage the notches 37 to hold the carrier in any one of its three predetermined positions with relation to the proper register of the objective powers with the optical axes. The plunger has a handle 42.

A spring is provided which tends to push the carrier outward or to the right in Figures 1 and 3. The spring 43 is contained within a tube 44 fast in the lens body 11 and extends into a bore 45 in the carrier 25 against a screw 46 which closes the bore.

From the foregoing it will be seen that the objective carrier 25 is provided with two pairs of paired objectives by sliding the units transversely onto the carrier. The latter may have suitable stops as 50, Figure 2, to stop the units in position. That thereafter the carrier 25 may be moved outwardly on the track 36 by pulling the plunger 41 out of its notch and let go of it, when the spring 43 will move the carrier outward until the plunger snaps into another notch. Or the carrier may be moved inward by disengaging the plunger and moving the carrier against the force of the spring until another notch is engaged by the plunger.

In this manner any one pair of the three pairs of objectives may be moved to register with the bores 16 and in each instance the paired objective is brought into converging relation or alinement with the converging optical axes through the bores 16.

Figures 1 and 3 show the objective carrier in its middle position. Its outward movement is arrested by a stop plate 55. Figure 2 shows in dotted lines an objective unit about to be removed from the carrier.

It will be seen that this invention, therefore, provides means for using three pairs of objectives at one time, and in addition two of the pairs may be readily interchanged with two other pairs. Consequently the capacity, hence the efficiency and range of the microscope is materially increased.

In practise, the microscope will be furnished to the user with as large a number of objective units as may be required for the particular use of the microscope, so that by a simple interchange of units in the carrier, a wide range of powers of magnification may be obtained.

It will be noted that the objectives are supported in a manner preventing entrance of dust or foreign particles into the objective units. Another advantage resides in the quick moving back and forth of the carrier in order to use the different powered objectives without shaking or disturbing the specimens on the stage, the construction being very rigid because of the large surface contact between the carrier and the plate.

I claim:

1. A binocular microscope comprising a plate for supporting the lens tubes, a track on said plate, a carrier supported to reciprocate on said track, a plurality of pairs of objectives in the carrier, a spring for automatically moving said carrier in one direction, means for moving the carrier in the opposite direction and detent means for yieldingly holding said carrier in position with any one of the said pairs of objectives for use in the optical axes of the microscope.

2. A binocular microscope comprising a plurality of pairs of objectives, a carrier for said objectives and means for reciprocating said carrier, rectilinearly and laterally, in a plane at substantially right angles to the plane of the binocular axes for adjustably positioning each of said pairs of objectives, selectively, for use in the binocular axes.

3. A binocular microscope comprising a plurality of sets of twin objectives for the binocular axes, a carrier for said objectives and means for reciprocating said carrier, rectilinearly and laterally, in a plane at substantially right angles to the plane of the binocular axes, for selectively positioning said sets of objectives for use in said binocular axes.

4. A binocular microscope having converging optical axes, a plurality of sets of twin objectives for said optical axes, a carrier for said objectives and means for reciprocating said carrier, rectilinearly in a plane substantially perpendicular to the bisector of the angle included between said optical axes for selectively positioning said sets of twin objectives for use in said optical axes.

5. A binocular microscope having converging optical axes, a carrier, means for reciprocating said carrier rectilinearly and laterally and a plurality of sets of twin objectives for said optical axes mounted on said carrier in interchangeable and adjustable relation thereto by a movement at right angle to the said reciprocatory movement of said carrier.

6. A binocular microscope having converging optical axes, a carrier, means for reciprocating said carrier rectilinearly and laterally, a plurality of sets of twin objectives for said optical axes mounted on the carrier in detachable interchangeable relation thereto, a spring for moving the carrier in one direction, means for limiting said movement and means for moving the carrier in the opposite direction.

7. A binocular microscope comprising a plate for supporting the lens tubes, a carrier slidably supported on said plate, a pair of objectives stationarily mounted in said carrier, means for detachably mounting other pairs of objectives in said carrier, a spring for moving the carrier in one direction on the plate and means for moving the carrier in the opposite direction to selectively position any one of the said pairs of objectives for optical use with the said lens tubes.

8. A binocular microscope comprising means for supporting the lens tubes, a carrier mechanism for reciprocating said carrier rectilinearly and laterally on said supporting means, a plurality of pairs of twin objectives and means for detachably supporting said twin objectives on said carrier.

9. A binocular microscope comprising a plate for supporting the lens tubes, a plurality of pairs of objectives, a carrier supporting the latter and co-operating means on said plate and carrier for supporting and operating the carrier by a rectilinear lateral reciprocatory movement on said plate, to place any one pair of the said pairs of objectives in position for use in the optical axes of the microscope and locking said carrier in operated position.

Signed at Frankfort-on-the-Main, Germany, this 31st day of January, A. D. 1930.

MAX ENGELMANN.